United States Patent

[11] 3,579,234

[72] Inventors Takao Tsumura;
Toshio Kaooka; Keisuke Suzuki; Yoshiaki Ueda; Naoyoshi Oishi, Tokyo, Japan
[21] Appl. No. 824,514
[22] Filed May 14, 1969
[45] Patented May 18, 1971
[73] Assignee Japan Radio Company, Limited Tokyo, Japan
[32] Priority May 15, 1968
[33] Japan
[31] 43/32655

[54] CHARACTER GENERATOR FOR RADAR DISPLAY
19 Claims, 9 Drawing Figs.
[52] U.S. Cl. ................................................. 343/5,
315/22, 340/324
[51] Int. Cl. ...................................................... G01s 7/12,
G01s 7/22
[50] Field of Search .......................................... 343/5, 5
(EI); 340/324.1; 315/22 (orig)

[56] References Cited
UNITED STATES PATENTS
3,182,308  5/1965  Dutton et al. .................. 343/5EI
3,444,319  5/1969  Artzt et al. .................... 340/324.1X Primary Examiner—Rodney D. Bennett, Jr
Assistant Examiner—Malcolm F. Hubler
Attorney—Flynn & Frishauf ABSTRACT: A character-generating system for use with a radar system wherein coded radial element signals and coded circular element signals are generated in response to the trigger and heading signals, respectively, generated by the radar system. The coded radial and circular element signals are combined to form a plurality of pattern signals representing a plurality of characters. The pattern signals are then selected and combined with the video radar information to form a composite signal which is fed to the radar display.

CHARACTER GENERATOR FOR RADAR DISPLAY

The present invention relates to the generation of characters and the displaying thereof with radar video signals on the PPI indicator of a radar receiver or the like. More particularly, it relates to an apparatus for simultaneously representing alphanumeric characters generated by utilizing the sweeping trigger and heading signals of a radar receiver, at a particular location on the PPI display of a radar receiver of the like.

Radar receivers have, in the past, displayed only the echo signals received from an object without displaying a reference image, such as a time reference signal giving the actual time when the echo signals are received by the receiver. This limitation has reduced the value of a recorder radar display when it is later reproduced because the display presents no time or any other reference data. Thus, it is difficult to identify the display when it is reproduced at a later date.

In order to obviate this disadvantage, prior art radar displays have been recorded with voice signals carrying the necessary identification information. But this practice does not provide a precise time reference which can change every second in synchronism with the reproduced radar display. Moreover, the construction and operation of such prior art devices was quite complex due to the insertion of the voice signals.

Therefore, it is an object of the present invention to provide a device for simultaneously displaying radar signals and the necessary reference characters, such as an actual time reference.

It is a further object of the present invention to provide a radar device for displaying reference characters which are separately arranged in relation to one another, the characters being simultaneously displayed with the radar signals on a PPI display at predetermined positions.

SUMMARY OF THE PRESENT INVENTION

The character generator of the present invention receives the trigger and heading signals generated by a radar equipment. The sweeping trigger signal is delayed and is applied to, and starts, a radial oscillator, the output of which is encoded into the radial element signals corresponding to the vertical components of the characters to be represented on the radar display.

The heading signal is delayed and is applied to, and starts, a circular oscillator, the output of which is encoded into circular element signals corresponding to the horizontal components of the characters to be represented on the radar display.

The radial and circular element signals obtained are applied to a mixer to produce coded segment signals corresponding to specific segments of the characters. These coded segment signals are then applied to a segment signal composer, wherein they are composed into a patter signal corresponding to a specific character.

Further provided is an output controller for combining the signals corresponding to the character to be displayed with the current radar signals is synchronization with each other. The resultant composite output signals of the output controller are fed to the radar indicator for simultaneous representation on the PPI display thereof.

The invention will be described hereinbelow with reference to generating alphanumeric characters. However, it should be clear that the inventive concept disclosed is equally applicable to the generation of other types of characters or reference information.

Figure 1:
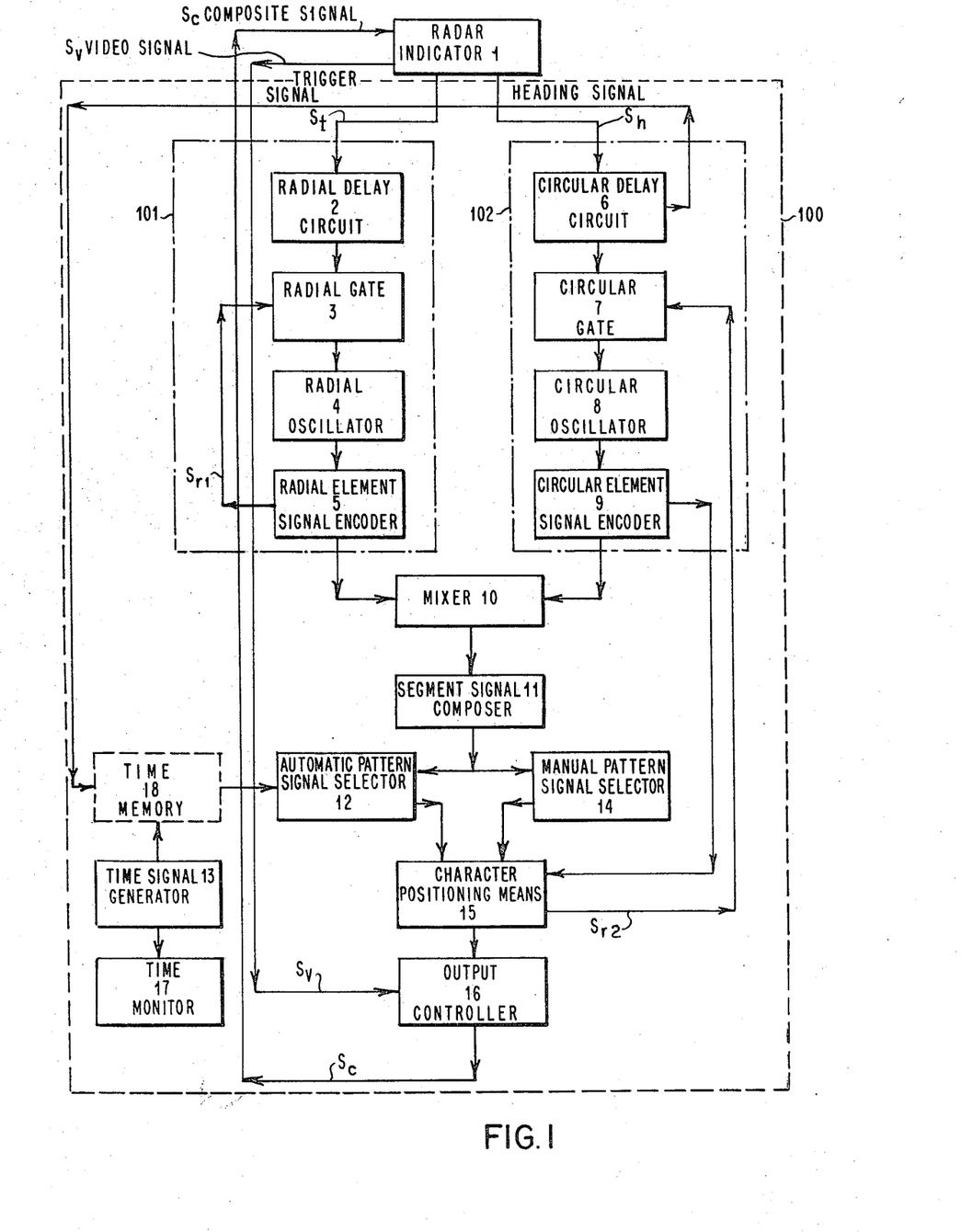
FIG. 1 is a schematic block diagram of the component units of the present invention.

FIG. 1 illustrates a general block diagram of the invention. The apparatus of this invention, generally indicated by the elements included within the dashed block 100, is connected to a radar indicator of conventional construction, generally indicated by block 1. The radar indicator 1 generates sweep trigger and heading signals in a manner well known in the art.

A radial signal encoder channel 101, including a radial delay circuit 2, a radial gate circuit 3, and a radial oscillator 4 (of standard construction) and a radial element signal encoder 5, all coupled together in series, is connected to the trigger signal output of the radar indicator 1 to receive the sweep trigger signals $S_t$. A reset line is provided between encoder 5 and radial gate 3.

A circular signal encoder channel 102, including a circular delay circuit 6, a circular gate 7, a circular oscillator 8 (of standard construction) and a circular element signal encoder 9, all connected in series, is connected to the heading signal output of the radar indicator 1 to receive heading signals $S_h$.

The outputs of encoders 5 and 9 are fed to a mixer 10, the output of which is fed to segment signal composer 11. The remainder of FIG. 1 will be discussed in detail hereinbelow.

When sweep trigger signal $S_t$ is received by the radial signal encoder channel 101, the trigger signal $S_t$ is applied directly to radial delay circuit 2. Radial delay circuit 2 has a delay corresponding to the radial distance from the origin of the radial sweep to the location on the radar display at which the desired reference characters shall be started in its representation on the radar display. The output of delay 2 is applied to a radial gate 3. This enables gate 3 and allows the signal from delay 2 to pass through gate 3 into radial oscillator 4 to turn radial oscillator 4 on.

Figure 4:
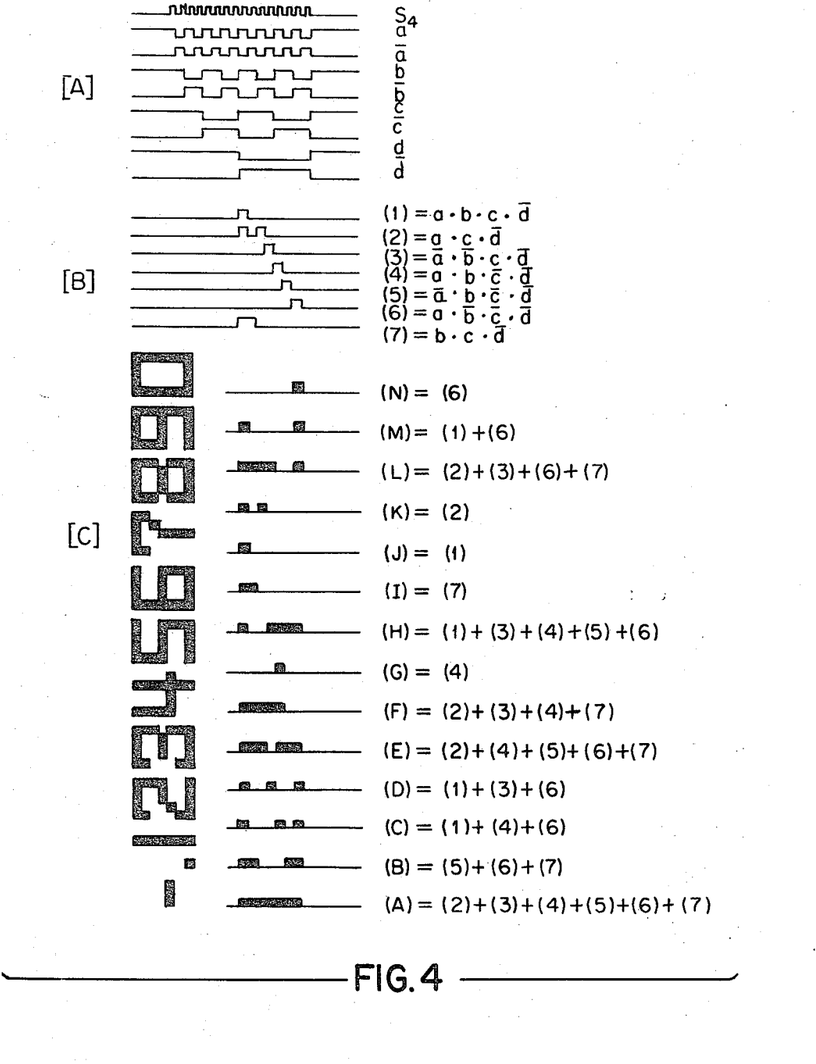
FIGS. 4 and 5 are diagrams illustrating the waveforms of the radial and circular element signals, respectively, corresponding to the vertical and horizontal segments of reference alphanumeric characters.

The output pulses of radial oscillator 4 are fed to radial element signal encoder 5 to drive an internal flip-flop circuit (not shown). The flip-flop circuit employed in encoder 5 of this invention includes four stages of flip-flops and performs a cycle of logical AND/OR operations on the output pulse of radial oscillator 4 by means of a diode matrix (not shown) which is also included in the radial element signal encoder 5. This results in delivery of a specified number of radial element signals encoded against the vertical components of the segmented alphanumeric characters as shown in FIG. 4 c for later mixing with the circular element signals which are derived from the circular signal encoder channel as described below.

A rest signal $S_{rl}$ is delivered from radial element signal encoder 5 to radial gate 3 when the flip-flops of encoder 5 complete a cycle of operation. This turns off radial oscillator 4 until the next sweep trigger signals $S_t$ is applied to radial delay circuit 2, the output of which will cause radial oscillator 4 to be turned on again.

Figure 5:
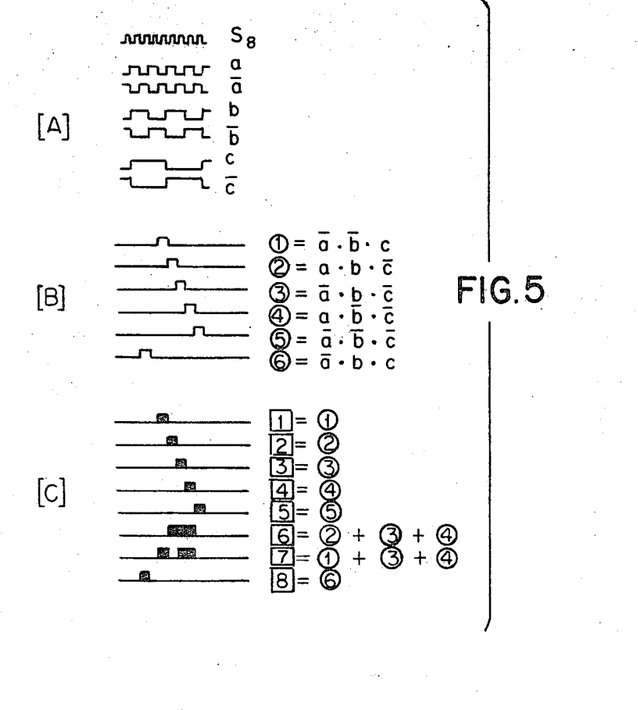

A heading signal $S_h$, generated by radar indicator 1, is applied to circular delay circuit 6. Circular delay circuit 6 has a delay corresponding to the circular distance from the heading to the location at which a desired reference character shall be started in its representation on the radar display. The circular signal encoder channel 102 operates substantially in the same manner as the radial encoder channel 101. That is, circular gate 7 is caused to open after the delay period of circular delay circuit 6 has expired. This turns on circular oscillator 8. The output pulses of circular oscillator 8 are then fed to circular element signal encoder 9 to drive three stages of internal flip-flops (not shown), which perform cycles of logical AND/OR operations on the output signal of circular oscillator 8 by means of a dioxide matrix (not shown) which is also included in the circular element signal encoder 9. This results in delivery of a specific number of circular positioning signals encoded against the horizontal components of the segmented alphanumeric characters as shown in FIGS. 5 [B] and [C] for later mixing with the radial segments signals delivered from the radial signal encoder channel 101.

A reset signal $S_{r2}$ is transmitted to circular gate 7 from a character positioning means 15 (described hereinbelow) to turn off circular oscillator 8. The reset signal $S_{r2}$ is not generated until circular oscillator 8 has provided the necessary number of circular positioning signals for all of the alphanumeric characters to be displayed.

Figure 6:
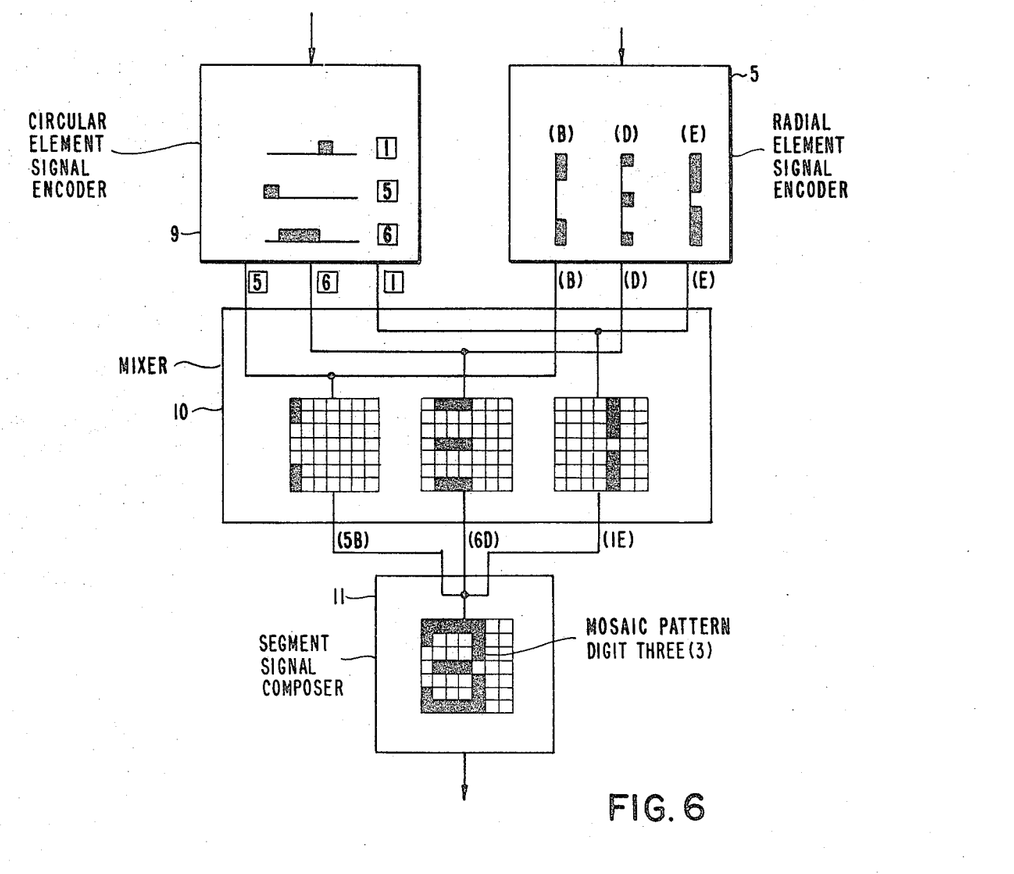
FIG. 6 illustrates how the vertical and horizontal segment signals re combined into the signals representative of a specific alphanumeric character.

The output signals from a radial and circular element signal encoders 5 and 9, respectively, are fed in synchronization with each other to mixer 10, wherein the signals are mixed by means of logical AND/OR operations into successive vertical segment signals which correspond to the specified vertical components of all alphanumeric characters to be displayed [see FIG. 6 (10)].

The segment signal composer 11 receives the output 20 of mixer 10 and composes it, through logical AND/OR operations, into a specified number of pattern signals for the alphanumeric characters to be displayed [see FIG. 6 (11)].

The pattern signals thus obtained are applied to an automatic pattern signal selector 12 or a manual pattern signal selector 14. The appropriate pattern signals are selected thereby under control of a time signal generator 13, which supplies clock or timing signals denoting actual time to automatic pattern signal selector 12 through a time memory 18 as well as to a time monitor 17.

The pattern signals selected by automatic and manual pattern signal selectors 12 and 14 are fed to a character positioning means 15, where their positions are signals are determined. The output signals of character-positioning means 15 (i.e. the final pattern signals) are then applied to an output controller 16, which combines the final pattern signals with radar video signals $S_r$ from the radar indicator 1 into a composite signal $S_c$, and transmits a composite signal back to the radar indicator 1 for display. Composite signal $S_c$ contains the radar information as well as reference character signals.

After character positioning means 15 determines the positions of all of the alphanumeric reference characters to be displayed, the reset signal $S_{r2}$ is generated by character-positioning means 15 and fed to circular gate 7 to stop the operation of circular oscillator 8.

A more detailed description of the construction and operation of the apparatus of this invention will now be given below with reference to FIG. 2. Corresponding elements are given the same reference designations wherever possible throughout the drawings.

Figure 2:
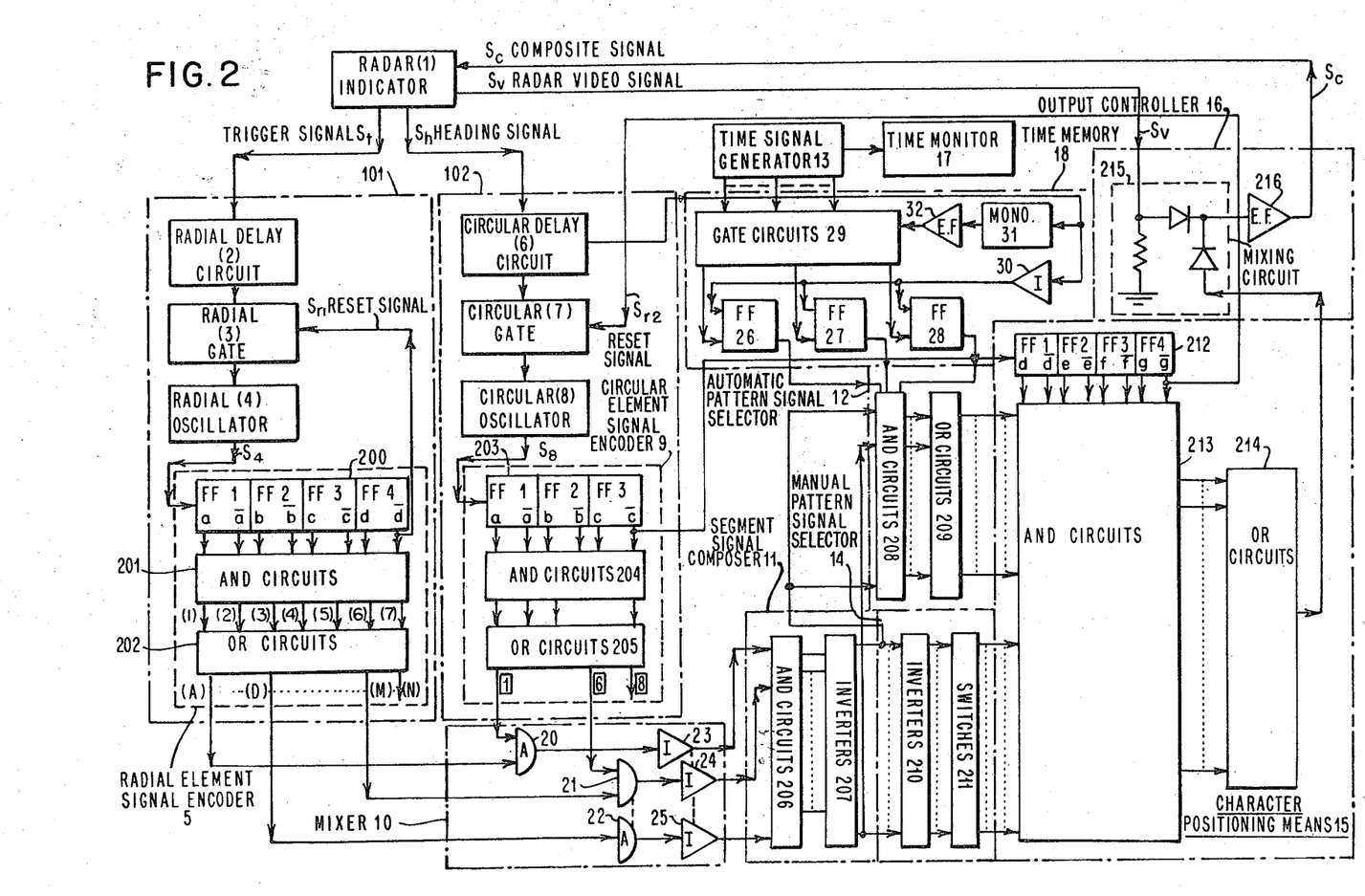
FIG. 2 shows the system of FIG. 1 in more detail.
Figure 3:
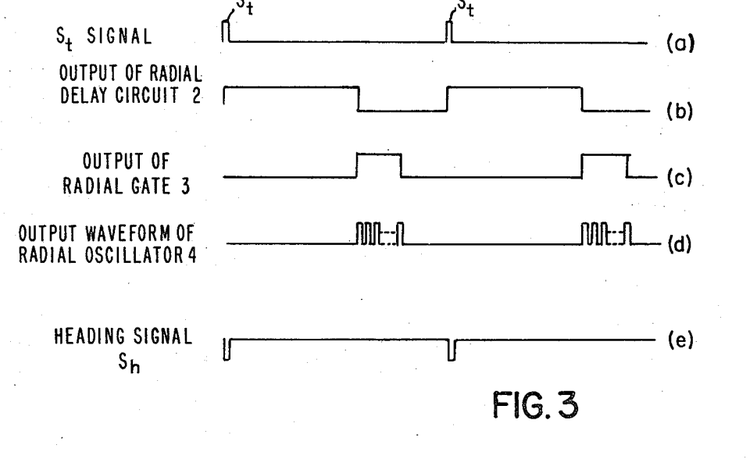
FIG. 3 is a diagram illustrating the pulse waveforms used in the apparatus of this invention.
Figure 9:
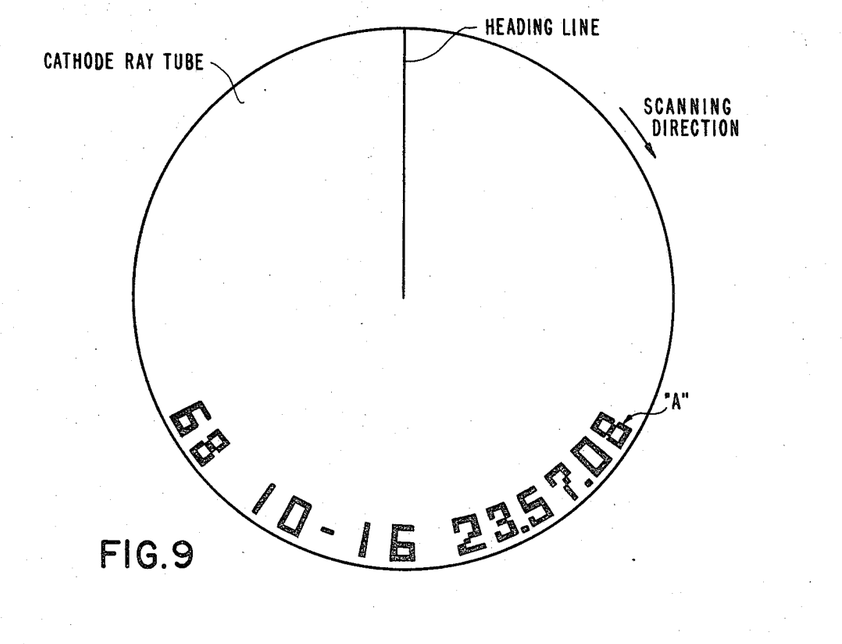
FIG. 9 id a diagram illustrating an example of the alphanumeric characters represented on a PPI radar display to denote 23 o'clock–57 minutes–08 seconds, the 16th of Oct. in 1968.

Referring to FIG. 2, a typical radial delay circuit 2 comprises a monostable multivibrator, which functions to properly position the starting point of the vertical component of a segmented alphanumeric character on the radial sweep of PPI radar indicator 1. That is, the monostable multivibrator is turned on by an input sweep trigger pulse $S_t$ shown in FIG. 3a and remains on for a predetermined period to time which is determined by the time constant of the monostable multivibrator. The trailing edge of the output of delay circuit 2 opens radial gate 3 as shown in FIGS. 3b and 3c. Oscillator 4 is thereby started. Thus, delay circuit 2 delays the start of radial oscillator 4 (i.e. the starting point of the vertical component of the segmented alphanumeric character) by a delay time which corresponds to a distance measured over the radial sweep with respect to the origin thereof on the display of the PPI indicator of radar indicator 1. A typical composite radar display is shown in FIG. 9, the starting point of the alphanumeric display being indicated by "A." A variable resistor and capacitor are provided in the monostable multivibrator within delay circuit 2 to allow the time constant to be made variable, thus making the "on time" of the multivibrator variable depending on the working range of the radar. Varying the time constant is accomplished in a manner known in the art. A variable resistor provides means for making a fine adjustment of the position of the segmented alphanumeric character in the radial direction.

Radial gate 3 consists of a flip-flop of generally well known design. As described above, the flip-flop circuit is set by the trailing edge of the output signal from radial delay circuit 2 [see FIGS. 3b and 3c]. The flip-flop in radial gate 3 remains in the on condition as shown in FIG. 3c until reset signal $S_{r1}$ is applied from radial element signal encoder 5 to radial gate 3. It should be clear to those skilled in the art how reset signal $S_{r1}$ resets the flip-flop in radial gate 3.

The positive voltage level [see FIG. 3c] is then applied to radial oscillator 4 to start its oscillation as shown in FIG. 3d. Radial oscillator 4 is stopped when radial gate 3 is turned off by rest signal $S_{r1}$. This operation can be achieved in various well-known ways by those skilled in the art. For example, the radial oscillator 4 may include an internal switching circuit which turns the oscillator on and off in response to the output of gate 3.

Radial oscillator 4 may comprise an astable multivibrator, which enables adjustment of the height (i.e., the radial width) of the segmented alphanumeric character displayed on the PPI scope. The switching circuit of radial gate 3 is then connected to the transistors of the astable multivibrator circuit to turn it on-and-off.

The waveforms of FIGS. 3d and 3e show the output waveform of radial oscillator 4 and the heading signal $Sh$ (to be described hereinafter), respectively.

Radial element signal encoder 5 encodes the output signal of radial oscillator 4 into radial element signals corresponding to the vertical components of the alphanumeric character to be displayed. The characters to be displayed in this embodiment are divided into five (5) vertical segments to form a mosaic pattern consisting of 5×7=35 mosaic blocks. Accordingly, radial element signal encoder 5 includes a circuit for encoding the output of radial oscillator 4 into the radial element signals required to properly compose the radial segment signals corresponding to the five components of the alphanumeric character segmented vertically. As shown in FIG. 2, radial encoder 5 includes a four-stage flip-flop circuit 200, the outputs of which are coupled to a logical AND circuit 201 (which comprises a diode matrix and transistor circuits). The flip-flop circuit 200 divides the frequency of the input pulses from radial oscillator 4 by 16 at the output of the 4th stage flip-flop (FF 4) by dividing the input frequency by 2 at each of the four flip-flop stages in flip-flop circuit 200. The frequency division is illustrated in FIG. 4 [A], where waveforms $a, \bar{a}, b, \bar{b}, c, \bar{c}, d$ and $\bar{d}$ show the waveforms appearing at each successive output of the four stages FF1—FF4 of flip-flops 200 and signal $S_4$ denotes the output of radial oscillator 4.

The trailing edge of the waveform $\bar{d}$ of FIG. 4 [A] is applied to radial gate 3 as the reset signal $S_{r1}$. This causes radial oscillator 4 to be turned off and all of the flip-flops FF1—FF4 in radial element signal encoder 5 remain with their output waveforms in the condition established when the oscillator 4 was turned off.

In the above description, flip-flop circuit 200 includes four stages of flip-flops. However, a three-stage flip-flop circuit could handle the output signal $S_4$ of radial oscillator 4 for a system using a mosaic pattern with 5×7=35 mosaic blocks. But, when the flip-flop circuit repeats its ON-and-OFF operation at a high speed, a time interval of several cycles is required before the output frequency of radial oscillator 4 is stabilized. Thus, the radial element signal encoder 5 of the present apparatus includes a four-stage flip-flop circuit in order to allow radial oscillator 4 to provide an output waveform $S_4$ having 16 cycles, the first 8 cycles of which are assigned as stabilizing cycles and are not used. The next 8 cycles are reserved as the interval during which the logical AND and OR circuits of radial element signal encoder 5 are allowed to operate on the output waveforms of radial oscillator 4.

The waveforms (1)—(7) shown in FIG. 4 [B] are the seven (7) outputs of AND circuit 201 of the present embodiment. The design of AND circuits 201 to obtain waveforms (1)—(7) of FIG. 4 [B] from the waveforms of FIG. 4 [A] should be apparent to one skilled in the art. Well-known boolean algebra techniques may be implemented in determining the actual AND circuit configuration, which is not shown herein for the sake of clarity so as not to unduly obscure the invention.

FIG. 4 [C] illustrates the digits 0, 1.......9, a dash and a decimal point (or period) which are the alphanumeric characters to be displayed by the described apparatus. These characters can be constructed with the 14 types of radial segment signals (A) through (N) (also shown in FIG. 4 [C]) which correspond to the vertical components of the alphanumeric characters. The 14 waveforms (A) through (N) of FIG. 4C are obtained by combining the AND circuit output waveforms (1)—(7) of FIG. 4 [B] in OR circuit 202. The particular design of OR circuit 202 to obtain the waveforms of FIG. 4C should be apparent to those skilled in the art by using boolean algebra design techniques.

The present electronic character generating apparatus is designed to handle 14 types of the radial segment signals to compose an alphanumeric character. The number of radial segment signals will naturally be reduced if more simplified patterns are used and will be increased if more complex patterns are used.

In the circular signal encoder channel 102, circular delay circuit 6 provides the necessary delay for starting circular oscillator 8 in order that the horizontal components of an alphanumeric character represented on the PPI display are positioned at the desired position in the circular direction. Similar to radial delay circuit 2, circular delay circuit define may include a monostable multivibrator which, when started by a heading signal $S_h$, operates in the same manner as the monostable multivibrator of radial delay circuit 2. Signal waveforms are as shown in FIG. 3 for the corresponding elements in the circular signal encoder channel 102.

Circular gate 7 is constructed similar to, and operates in the same manner as, radial gate 3. Circular oscillator 8 may comprise an astable multivibrator, as in the case of radial oscillator 4, and provides facilities to define the circular width on a PPI display from the heading line to the starting point of the alphanumeric character to be displayed. One of the two transistors in the astable multivibrator of oscillator 8 has an emitter circuit grounded through the switching circuit of circular gate 7 to turn oscillator 8 on when the switching circuit of gate 7 is closed. The time constant of oscillator 8 is made variable to enable fine adjustment of the circular width of the alphanumeric character to be displayed. Oscillator 8 is stopped by supplying circular gate 7 with reset signal $S_{r2}$ from character-positioning means 15, which resets the switching circuit of gate 7, thereby turning the oscillator 8 off.

Circular element signal encoder 9, similar to radial element signal encoder 5, is composed of a flip-flop circuit 203 having three stages FF1—FF3 and logical AND and OR circuits 204 and 205, respectively, which use diode matrices and transistor circuits. The flip-flop circuit 203 is of the sequential type and performs no high-speed operation. AND circuit 204 and OR circuit 205 are not shown in detail for ease of description.

FIG. 5 [A] illustrates output waveforms $a, \bar{a}, b, \bar{b}, c$ and $\bar{c}$ of the three stages of flip-flops FF1—FF3 in circular element signal encoder 9, which are operated by the output waveform $S_8$ of circular oscillator 8. The signal $S_8$ is frequency divided by 8 by flip-flops 203 to provide waveform $\bar{c}$ of FIG. 5 [A] which is sent to character-positioning means 15 wherein it is used as a reference signal for the number and position of the alphanumeric characters to be displayed. The three stages of flip-flop circuit 203 repeat their cycle of operation until a reset signal $S_{r2}$ is sent from character positioning means 15 to circular gate 7 after the flip-flops 203 of encoder 9 deliver their final outputs required to compose the necessary circular segment signals for all of the alphanumeric characters.

FIG. 5 [B] illustrates the output of the AND circuit 204 of encoder 9. FIG. 5 [C] illustrates the outputs of the OR circuit 205 of encoder 9 which are the circular positioning signals for an alphanumeric character.

In the present system the circular logical OR circuit 205 must provide at least six (6) circular positioning signals. Circular encoder 9 should provide circular segment signals that correspond to an alphanumeric character divided into five horizontal segments and an additional circular positioning signal is required to provide means for representing a decimal point with an alphanumeric character. In practice, circular logical OR circuit 205 provides a total of eight circular positioning signals as shown in FIG. 5 [C], of which the additional two positioning signals are intended to simplify the logical operation of the radial segment signals assigned to the alphanumeric characters, 3, 4, 5, 6 and etc. which have the common three vertical components in their pattern (see FIG. 4 [C]).

The coded radial and circular element signal mixer 10 consists of 22 sets of mixing circuits, each set including a logical AND and an inverter circuit. Only three AND circuits 20—22 and associated inverter circuits 23—25 are shown for ease of description. Mixer 10 receives the output signals of both the radial and circular signal encoder channels 101 and 102, respectively, and mixes them to derive segment signals. The coded radial element signals define the radial position of the segment signals and the circular positioning signals define the duration of the signal.

Segment signal composer 11 comprises a diode matrix 206 for performing a logical AND operation on the outputs of mixer 10. The matrix outputs are coupled to inverters 207 which function as logical OR circuits. Composer 11 composes the segment signals supplied form signal mixer 10 into the alphanumeric character pattern signals, as described below.

In summary, the coded radial and circular element signal mixer 10 and the segment signal composer 11 function to convert the outputs of the radial and circular signal encoder channels into an alphanumeric character pattern signal. This will be explained below with reference to FIG. 6, which illustrates converting the coded radial and circular element signals into a specific alphanumeric character pattern signal for representation of a digit three (3).

Coded radial element signal (B) (see FIG. 4 [C]) from radial element signal encoder 5 and coded circular element signals (see FIG. 5 [C]) from circular element signal encoder 9 are converted by signal mixer 10 into a segment signal (5B). Similarly, radial element signals (D) and (E) and circular element signals   and   are converted into segment signals (6D) and (1E), respectively, in mixer 10. These segments signals (5B), (6D) and (1E) are then applied to segment signal composer 11, where said segment signals are converted by means of a logical OR operation in composer 11 into the alphanumeric character pattern signal for representation of a mosaic pattern digit three (3). The particular design of mixer 10 and composer 11 to obtain the signals of FIG. 6 should be apparent.

Automatic pattern signal selector 12, consisting of logical AND and OR circuits 208, 209, respectively (shown in more detail in FIG. 7), selects the required alphanumeric character pattern signal among the output signals of segment signal composer 11 under control of the clock signals fed from time signal generator 13 and sends them to character-positioning means 15. The selection process is described below with reference to FIG. 7.

The time signal generator 13 may comprise for example, a crystal clock with fundamental frequency of 100 kHz. The fundamental frequency is frequency divided within generator 13 to produce the time signals comprising six types of clock signal, i.e. the "second," "10-second," "minute," "10- minute," "hour," and "10-hour" clock signals, which are fed directly, or, in this embodiment, via time memory 18 to the automatic pattern signal selector 12.

The time signals from time signal generator 13 are also fed to a time monitor 17, where they are displaced by a digital indicator to monitor the digits indicating the actual time.

Time memory 18, as shown in FIG. 2, is mainly composed of flip-flop circuits 26-28, a gate circuit 29 comprised of a plurality of AND gates, an inverter circuit 30, a monostable multivibrator 31 and an emitter-follower amplifier circuit 32. The output of monostable multivibrator 31 is fed by means of the emitter-follower amplifier circuit 32 to the gate 29. A pulse similar to the waveform of FIG. 3b is applied from the circular delay circuit 6 in the circular signal encoder channel to the monostable multivibrator 31 of the time memory 18 to trigger the multivibrator on the leading edge thereof.

In the present embodiment, time signal generator 13 delivers a total of 45 output pulses, which include 10 "-second" pulses, 6 "10-second" pulses, 10 "minute" pulses, 6 "10-minute" pulses, 10 "hour" pulses and 3 "10-hour" pulses. These pulses are required for digital representation of the actual time.

Accordingly, 45 connecting lines are required between the time signal generator 13 and the automatic pattern signal selector 12. Therefore, time memory 18 must also have 45 input terminals and 45 output terminals.

The time memory 18 memorizes the circular position of an alphanumeric character pattern signal starting to appear on a radar indicator display and the time thereof (the time for start of an alphanumeric character pattern signal representation in this apparatus).

A trigger pulse [shown in FIG. 3b ] is applied from the circular delay circuit 6 to time memory 18 and resets the flip-flops 26-28 in time memory 18 with the rising edge thereof to erase the previous memories. Flip-flops 26—28, after the falling edge of the trigger pulse of FIG. 3b start the memory operation and later memorize "second," "10-second," "-minute," "10-minute," "hour" and "10-hour" time pulses. These time pulses are supplied from time signal generator 13 through the gates 29 of time memory 18 to flip-flops 26—28 when the gates 29 are enabled by an extremely short pulse generated by the monostable multivibrator 31 which was started with the falling edge of the trigger pulse applied to the time memory 18. Under normal conditions, the gate circuits 29 in time memory 18 are in the nonconducting condition to isolate the flip-flops 26—28 from the time signals incoming from time signal generator 13. When triggered, the gate circuits conduct and allow the time signals to pass through them to the flip-flops 26—28. Thus, a flip-flop 26—28 is changed into its inverse condition by a time signal only when a short pulse of several μs is applied to its associated gate in gate circuit 29 from monostable multivibrator 31. The flip-flops 26-—28 remain in that condition for memorizing the time signal, until it receives a reset signal via inverter 30.

The purpose of time memory 18 is to prevent the cathode ray tube on the PPI indicator from giving an erroneous time indication during the changing of a time reference display.

Suppose now that the present apparatus is going to display an actual time reference of 21 o'clock, 12 minutes, 39 seconds. PPI indicator 1 will start to represent said time reference on its PPI scope in the circular clockwise direction with its radial sweep which, rotating in synchronization with the radar antenna, completes one turn in 0.3 to 0.5 seconds. If the actual time becomes 21 o'clock, 12 minutes, 40 seconds during the later circular sweep of the radial sweep, then there will exist a problem in that the actual time will be erroneously indicated virtue 21 o'clock, 12 minutes, 49 seconds, instead of 40 seconds. This is due to the image of the number 9 remaining on the PPI scope by virtue of the image persistance of the PPI scope. Time memory 18 is provided to eliminate this malfunction by allowing the time to change only at the beginning, and not during, the sweep.

Figure 7:
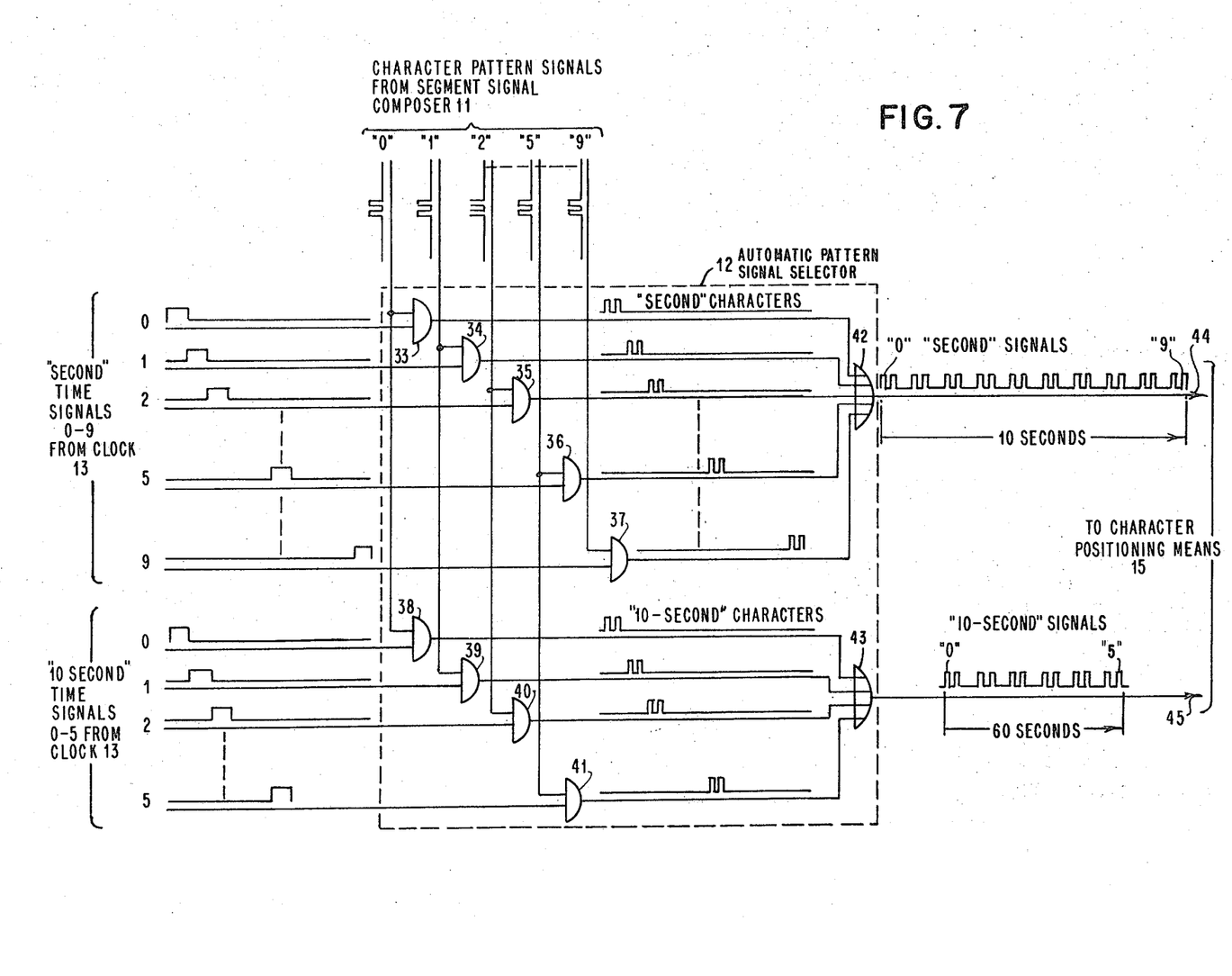
FIG. 7 illustrates the manner in which the waveforms of the vertical and horizontal segment signals re automatically selected by the automatic pattern signal selector under control of the clock signals.

Time signal generator 13 delivers the "second" time signals 0—9 and the "10-second" time signals 0—5, which are shown in FIG. 7, to automatic pattern signal selector 12. In FIG. 7, the time memory 18 signals are not shown for the sake of clarity. The time signal generator 13 repeats delivery of a "-second" pulse to the "second" signal lines 0 to 9 of FIG. 7 which correspond respectively to digits 0—9 in order at intervals of one second and also a 10-second pulse to the "10-second" signal lines 1 to 5 in order at intervals of 10 seconds. Provision is made, as mentioned previously, to advance the delivery of the 10-second pulse by one second at the moment when the "second" pulse is shifted from the "second" signal line 9 to the "second" signal line 0 in time signal generator 13.

Time signal generator 13 also delivers the "minute," "10-minute," "hour" and "10-hour" pulses to automatic pattern signal selector 12 in a similar manner as described above with respect to FIG. 7. Therefore, the function of time signal generator 13 concerning delivery of the "minute," "10-minute," "hour" and "10-hour" pulses is not described in detail herein for the sake of clarity.

The automatic pattern signal selector 12 selects the necessary alphanumeric character pattern signal among the outputs from the segment signal composer 11 in accordance with the time signals delivered from said time signal generator 13. The simplified pattern signal selector is partially shown in FIG. 7 by way of example only, and includes AND gates 33—41 and OR gates 42 and 43 to make the appropriate selections of signals. It should be clear that selector 12 may take other forms, depending upon system requirements. Now, suppose that a time signal of "25" is delivered from the time signal generator 13 to the automatic pattern signal selector 12. This corresponds to a condition where the "second" pulse is applied to the "second" signal line 5 and the "10-second" pulse to the "10-second" signal line 2, with no pulses being applied to other signal lines. The gate circuits 36 and 40 in the automatic pattern signal 12 are then enabled, thereby allowing the alphanumeric character pattern signals for mosaic pattern 5 and 2 from segment signal composer 11 to pass through the gates 36 and 40. Thus, as shown in FIG. 7, in the use of "-second" and "10-seond" alphanumeric character pattern signals 5 and 2, respectively, the numeral character pattern signals from segment signal composer 11 are selected by the AND gates of selector 12 as the signals for the digits in the "-second" and "10-second" positions. These signals are illustrated in FIG. 7 on the AND gate output leads within selector 12. These signals are passed through OR gates 42 and 43 where they are composed into the signals illustrated in FIG. 7 as the selector outputs and are then fed to the character-positioning means 15.

The above description is given for the case where the time signal generator 13 and the automatic pattern signal selector to 12 are connected together without the time memory 18. These functions are not substantially changed when the time signal generator 13 and automatic pattern signal selector 12 are operated with the time memory 18 inserted between them.

Thus, logical OR circuits (209 of FIG. 2; 42, 43 of FIG. 7) in selector 12 sequentially deliver the "second" and "10-second" signals (shown in FIG. 7) on the two output lines 44 and 45, respectively, of selector 12 in such manner that the "-second" and "10-seond" pulses corresponding to digits 0—9 and 0—5 are successively shifted at every second and 10 seconds, respectively, before they are applied to the character positioning means 15. Character-positioning means 15 is provided to correctly position the characters on the PPI display.

The manual pattern signal selector 14 consists of a plurality of inverters 210 and rotary switches 211, each switch being associated with a respective inverter. Selector 14 selects the necessary alphanumeric character pattern signal among the outputs from the segment signal composer 11 as the automatic pattern signal selector 12 does, but in accordance with the alphanumeric character patterns which are preset on the plurality of rotary switches, instead of in accordance with the time signals supplied from the time signal generator 13. In the present embodiment, there are 6 inverters and 6 rotary switches, one for each numeric character. Other configurations can be used.

The above-mentioned plurality of inverters 210 and rotary switches 211, provide for selection of the semifixed alphanumeric character pattern signals; for example, those corresponding to the digits expressing a year, month and day. The necessary alphanumeric character pattern signals are selected in accordance with the setting of the rotary switches and re delivered through the switches 211 to the character-positioning means 15. Thus, the alphanumeric character pattern signals selected by and delivered from the automatic and manual pattern signal selectors 12 and 14, respectively, are applied to the character-positioning means 15 wherein they are ANDed with positioning pulses (which will be described later) to correctly position the characters on the PPI scope.

The character positioning means 15 is composed of four (4) stages of sequential-type flip-flops 212 and logical AND and OR circuits 213 and 214, respectively. The number of the stages of flip-flops in the sequential-type flip-flop circuit 212 is determined by the number of alphanumeric characters to be displayed. In the present case, four flip-flop stages enable the display of 15 alphanumeric characters, inclusive of the spaces between the characters. One character is displayed during each "count" of the flip-flop circuit 212. The 16th count is used for resetting the circuit.

Figure 8:
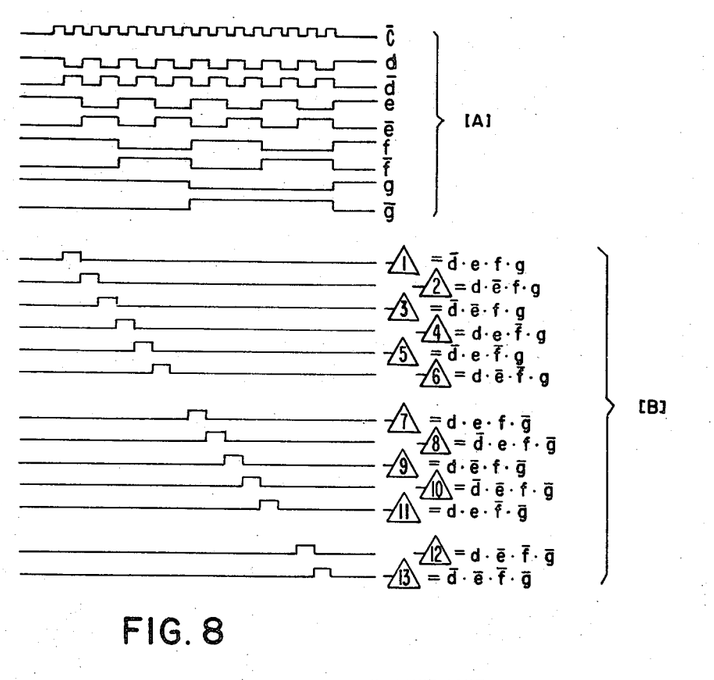
FIG. 8 illustrates how the selected vertical and horizontal segment signals are designated to their locations on a PPI display for their representation as an alphanumeric character.

To start the flip-flops 212, the pulse $\bar{c}$ shown in FIG. 5 [A] and in FIG. 8 [A] is applied from the circular element signal encoder 9 to the flip-flops 212. This causes, as shown in FIG. 8 [A], the flip-flops 212 to deliver output waveforms $d$ and $\bar{d}$ at the 1st stage FF1 and waveforms $e$ and $\bar{e}$, $f$ and $\bar{f}$ and $g$ and $\bar{g}$ at stages FF2, FF3 and FF4, respectively. In other words, flip-flops 212 provide one pair of its output pulses $g$ and $\bar{g}$ at stage FF4 after they receive 16 $\bar{c}$ pulses. The last output pulse $\bar{g}$ is fed back as reset signal $S_{r2}$ to the circular gate 7 and reset the flip-flops in the circular gate 7 with its trailing edge. This stops the operation of circular oscillator 8 after delivery of the required number of output signals for 15 alphanumeric characters, inclusive of the space between the characters.

The output waveforms $d$, $\bar{d}$, ... $g$ and $\bar{g}$ obtained from the four stages of flip-flops 212 are applied to the logical AND circuit 213, which comprises a diode matrix of the character-positioning means 15. The outputs of selectors 12 and 14 are applied to AND circuit 213 of positioning means 15. AND circuit 213 operates on these signals to generate the 13 types of positioning pulses △ through △ shown in FIG. 8 [B], with a space being provided between pulses △, △ and △, △. The signals △ - △ are then applied to the logical OR circuit 214 of character positioning means 15.

As stated above, logical AND circuit 213 performs a logical AND operation on the alphanumeric character pattern signals from the automatic and manual pattern signal selectors 12 and 14, respectively, with the positioning signals from flip-flops 212 to generate the above-mentioned 13 types of positioning pulses, shown in FIG. 8 [B]. That is, appropriate pattern signals from selectors are combined in coincidence with their corresponding positioning pulses. The combined signals are further combined in OR circuit 214 to form a pulse train, which is delivered to the output controller 16.

The output controller 16 consists of a mixer circuit 215 and an emitter-follower amplifier 216, and provides the necessary impedance matching between the radar video signal $S_V$ received from the PPI indicator 1 and the output pulse train supplied from the character-positioning means 15. Mixer 215 mixes these signals into a composite signal $S_C$ which, after being adjusted to provide the proper intensity on the PPI scope (by means not shown), is delivered to the PPI indicator 1. Composite signal $S_c$ contains both signals representing the radar information and signals representing the alphanumeric characters to be displayed simultaneously with the radar display.

The above description of the present invention is directed mainly to a system for representation of an electronic alphanumeric time reference on a PPI scope of a radar indicator. The apparatus is of course capable of representing references other than time references and is capable of representing any pattern other than the alphanumeric characters within the spirit of the invention.

This invention further allows its time reference signals to be recorded as the polar coordinate information signals together with the video signals for a radar display on a magnetic tape. When later reproduced, the time reference signals on the recorded radar display provide means for an effective identification and verification of the validity of the reproduced radar display.

It is pointed out that the radar indicator 1 with which the system according to the preset invention is used is well known in the art. The radar indicator 1 generates the heading and trigger signals in a well-known manner.

It is further pointed out that he logical AND and OR gating circuitry generally shown in the drawings as elements 201, 202, 204, etc., are shown merely by way of example. The internal connections within the gating circuitry is capable of being designed by one ordinarily skilled in the art in view of the detailed description set forth above taken in conjunction with the various illustrations of the waveforms appearing at the inputs and outputs of the various devices. Depending upon the types of characters desired, the AND and OR gating circuitry may take various different forms, as is well known in the art.

We claim:

1. Electronic character-generating system for a radar system generating first and second reference signals, comprising:
   a radial signal encoder channel responsive to said first reference signal for generating coded radial element signals;
   a circular signal encoder channel responsive to said second reference signal for generating coded circular element signals;
   means coupled to said radial and circular signal encoder channels for generating a plurality of pattern signals representing a plurality of characters from said coded circular element signals and coded radial element signals;
   a pattern signal selector for selecting predetermined pattern signals from said plurality of pattern signals;
   character-positioning means for combining character position information signals with said selected pattern signals to position said selected pattern signals at a desired position on the display of said radar system; and
   means for mixing the output signals from said character-positioning means with radar video signals from said radar system to form composite signals, said composite signals being transmitted to said radar system and displayed on the radar display thereof.

2. System according to claim 1, wherein said first and second reference signals are trigger and heading signals, respectively.

3. System according to claim 1, wherein said pattern signal generating means includes:
   means for deriving segment signals from said coded circular element signals and coded radial element signals;
   and means for comprising said segment signals into said plurality of pattern signals representing a plurality of characters.

4. System according to claim 1, wherein said radial signal encoder channel includes:
   a radial delay circuit coupled to receive said first reference signal from said radar system and delaying said first reference signal for a first predetermined period of time;
   a radial oscillator responsive to the output of said radial delay circuit for generating a plurality of radial element signals;
   a radial element encoder for encoding said radial element signals into coded radial element signals; and means responsive to an output from said radial element encoder to turn off said radial oscillator after a predetermined number of radial element signals have been generated.

5. System according to claim 4, wherein said means for turning off said radial oscillator includes a gate circuit coupled between said radial delay circuit and said radial oscillator, said gate circuit being responsive to said radial element encoder output to cause said radial oscillator to be turned off after generation of said predetermined number of radial element signals.

6. System according to claim 1, wherein said circular signal encoder channel includes:
- a circular delay circuit coupled to receive said second reference signal from said radar system and delaying said second reference signal for a second predetermined period of time;
- a circular oscillator responsive to the output of said circular delay circuit for generating a plurality of circular element signals; and
- a circular element encoder for encoding said circular element signals into coded circular element signals.

7. System according to claim 6, further comprising a second gating circuit coupled between said circular delay circuit and said circular oscillator.

8. System according to claim 7, wherein said radial signal encoder channel includes:
- a radial delay circuit coupled to receive said first reference signal from said radar system and delaying said first reference signal for a first predetermined period of time;
- a radial oscillator responsive to the output of said radial delay circuit for generating a plurality of radial element signals;
- a radial element encoder for encoding said radial element signals into coded radial element signals; and
- means responsive to an output from said radial element encoder to turn off said radial oscillator after a predetermined number of radial element signals have been generated.

9. System according to claim 8, further comprising:
a timing circuit; and
means feeding an output of said circular delay circuit to said timing circuit as a trigger signal.

10. System according to claim 8, further comprising means coupling an output of said circular element signal encoder to said character positioning means as a trigger signal.

11. System according to claim 8, further comprising means coupling a signal from said character-positioning means to said second gating circuit to cause said second gating circuit to turn off said circular oscillator after signals representing a predetermined number of characters have been generated.

12. System according to claim 3, wherein said deriving means includes a signal mixer for logically combining said coded circular and coded radial element signals into said segment signals.

13. System according to claim 12, wherein said composing means includes means for logically combining said segment signals into pattern signals representing predetermined characters.

14. System according to claim 1, further comprising a source of timing signals coupled to said pattern signal selector, said pattern signal selector selecting predetermined pattern signals in accordance with the outputs from said timing means.

15. System according to claim 14, wherein said timing means includes:
- a time signal generator generating a plurality of types of timing signals; and
- means coupling said plurality of types of timing signals to said pattern signal selector.

16. System according to claim 15, further comprising a time memory coupling said plurality of types of time signals to said pattern signal selector, said time memory including means for memorizing said plurality of types of time signals.

17. System according to claim 16, further comprising means coupling a trigger signal from said circular delay circuit to said time memory to enable said time memory.

18. System according to claim 1, wherein said pattern signal selector includes a manual pattern signal selector having a plurality of switches for preselecting predetermined pattern signals.

19. System according to claim 14, further comprising means coupling the output of said timing means to said character-positioning means, said character-positioning means logically combining said pattern signals with said time signals into a pulse train signal which represents predetermined characters.